H. P. TROUTMAN.
WHEEL AND SPRING TIRE.
APPLICATION FILED JULY 3, 1917.
1,259,451. Patented Mar. 12, 1918.
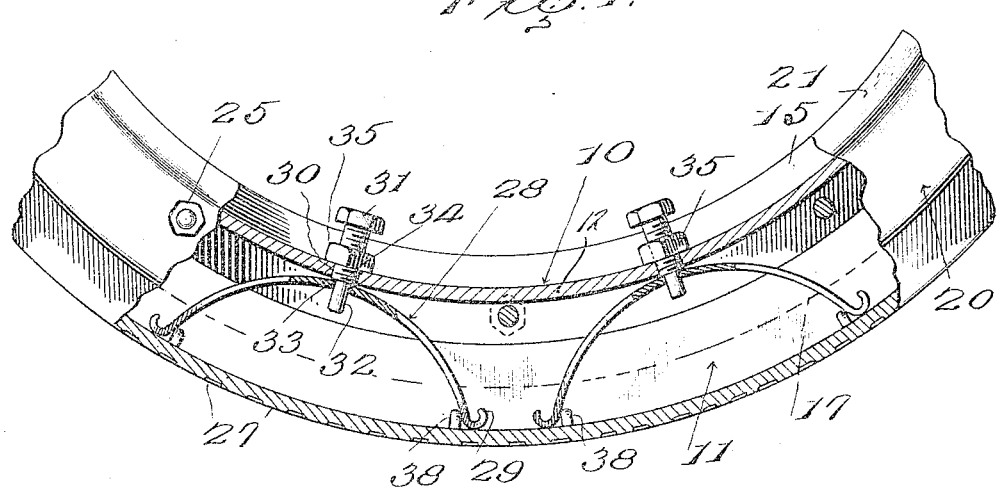
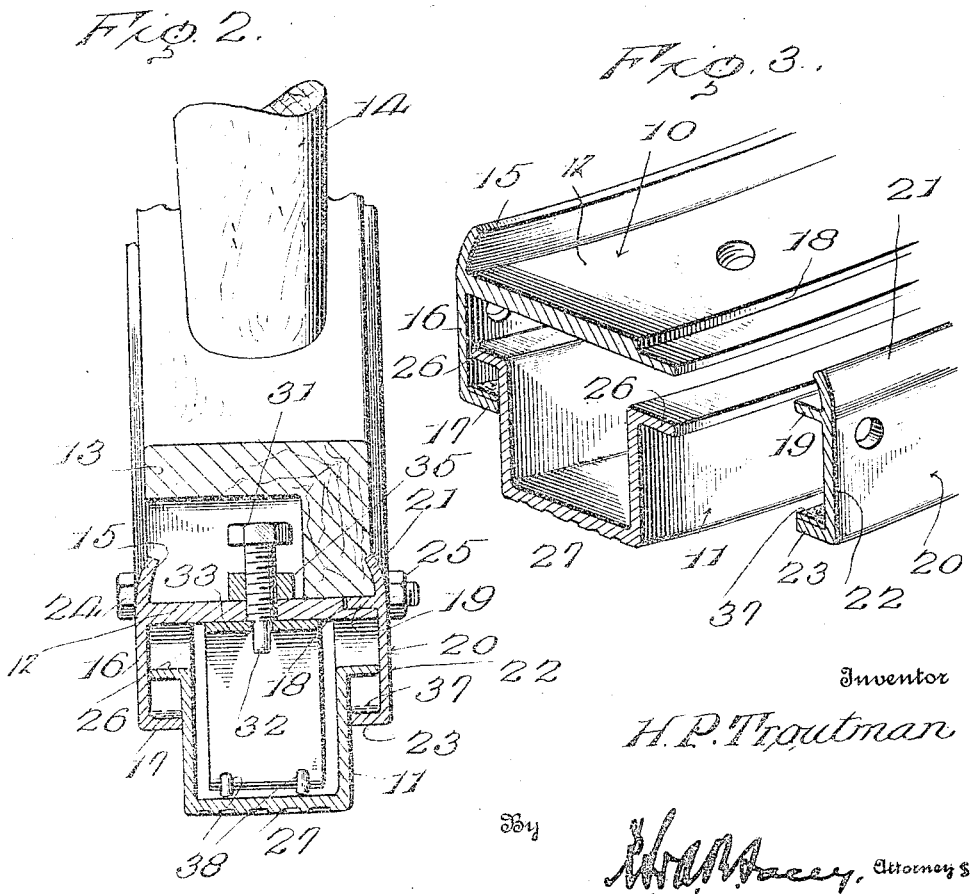
Inventor
H. P. Troutman
By
[signature], Attorneys

UNITED STATES PATENT OFFICE.

HENRY P. TROUTMAN, OF SAYRE, PENNSYLVANIA.

WHEEL AND SPRING-TIRE.

1,259,451.  Specification of Letters Patent.  Patented Mar. 12, 1918.

Application filed July 3, 1917. Serial No. 178,376.

*To all whom it may concern:*

Be it known that I, HENRY P. TROUTMAN, a citizen of the United States, residing at Sayre, in the county of Bradford and State of Pennsylvania, have invented certain new and useful Improvements in Wheels and Spring-Tires, of which the following is a specification.

My invention relates to new and useful improvements in spring tires for wheels and more particularly for the wheels of self-propelled vehicles, the primary object of my invention being the provision of an all metallic tire including a box-like rim divided peripherally into clamping sections adapted to be secured against opposite sides of the felly of a wheel and to firmly hold a tread member, cushioning means being interposed between the felly engaging portion of the rim and the tread member.

In this connection, a still further object of my invention is the construction of a wheel of this character in which substantially semi-elliptic cushioning springs are employed and in which means for readily adjusting the tension of the springs is provided.

A still further object of my invention consists in constructing a spring tire which will be secured upon the felly by the same fastening means which secure its parts together so that the felly need not be weakened by application of transverse locking bolts or other fastening means, such as are now commonly employed.

With these and other objects in view, my invention will be more fully described, illustrated in the accompanying drawing, and then specifically pointed out in the claims which are attached to and form a part of this specification.

In the drawing:

Figure 1 is a fragmentary elevational view of my improved spring tire, parts being broken away to show the internal construction;

Fig. 2 is a radial sectional view taken through my spring tire, showing it applied to a conventional form of felly;

Fig. 3 is a fragmentary sectional perspective view of the body section of the tire in unassembled position;

Corresponding and like parts are referred to in the following description and indicated in all the views of the drawings by the same reference characters.

My improved spring tire consists primarily of a box-like rim 10 and a tread member 11. The rim 10 includes a ring-shaped body portion 12 adapted to encircle the felly 13 of a wheel 14 and provided at one edge with an inwardly directed annular clamping flange 15 adapted to engage against one side face of the felly, as clearly shown in Fig. 2. At the same edge, the ring 12 is provided with an outwardly directed annular guide flange 16 terminating at its edge in an inwardly directed annular retaining flange 17 disposed in spaced relation to and concentric with the ring 12. The opposite edge of the ring 12 has its inner face cut-away to provide an annular seat 18 to receive an annular centering flange 19 extending inwardly from a locking ring section 20 having a portion 21 corresponding to the flange 15, a portion 22 corresponding to the guide flange 16, and a portion 23 corresponding to the retaining flange 17.

As will be readily appreciated by reference to Figs. 2 and 3 of the drawing, when the above described box-like rim is applied to the felly 13, the flanges 15 and 21 engage against opposite faces of the felly, and the flange 19 rests in the seat 18 and against the peripheral face of the felly. A plurality of bolts 24, passed through the portions 16 and 22 of the rim, directly below the rim portion 10 and secured by nuts 25, serve to firmly clamp the rim to the felly. This rim may be made of steel or other suitable metal and in various sizes and weights, dependent upon the type of wheel with which the tire is to be employed.

The tread portion 11 of the tire includes a hollow annular body member substantially U-shaped in cross section with its sides directed inwardly and terminating in laterally directed outwardly extending retaining flanges 26. The sides of this tread member are so spaced as to fit snugly between the inner edges of the flanges 17 and 23 and the flanges 26 are proportioned to engage against the inner faces of the flanges 16 and 22 of the rim so that all disengagement of the tread from the rim, when the parts are assembled, is prevented, although the tread is free for limited movement with respect to the rim. Preferably, the outer or tread face of the tread 11 is roughened or knurled, as indicated at 27, to provide a suitable traction surface.

A plurality of substantially semi-elliptic springs 28 are disposed between the rim and intermediate portion of the tread at spaced peripheral intervals, as indicated in Fig. 1. Each of these springs is preferably in the form of a single leaf, the ends of which are rebent outwardly upon themselves, as shown at 29, in order that they may ride easily along the inner face of the tread. These springs are so shaped and proportioned that, assuming there is no load upon the wheel, they must be somewhat compressed between the ring-shaped body portion 12 of the rim and the intermediate portion of the tread in assembling the wheel. Any number of these springs may be employed but they are preferably so spaced that when flattened to their greatest extent, due to application of an extremely heavy load upon the wheel, their ends will just touch each other so that one spring may support the next, under these circumstances, and so prevent breaking of the springs. The ring-shaped body 12 of the rim is provided with peripherally spaced threaded openings 30 through which are threaded adjusting bolts 31 having reduced unthreaded terminals 32 which project through openings 33 formed in the intermediate portions of the cushioning spring 28, the shoulders 34 of the adjusting bolts engaging the outer faces of the springs so that the springs may be compressed to a more or less extent by adjustment of the bolts. Lock nuts 35 are preferably provided for the bolts in order that they may be held in any adjusted position. The inwardly extending heads of these adjusting bolts may be located in pockets 36 formed in the felly, as clearly shown in Fig. 2 of the drawing.

Preferably the flanges 15 and 21 are curved inwardly to engage in seats formed in the sides of the felly and the bolts 35 being disposed at spaced intervals prevent turning of the rim about the felly. Also packing strips or bands 37 may be secured to the flanges 17 and 23 to engage against the side walls of the tread 11 and prevent entrance of dirt and moisture. These packing strips may be of rubber, felt, or other suitable material and may be so arranged as to render the parts silent during their relative movements.

If the wheel is to be used as a drive wheel, lugs 38 may be formed upon the inner face of the tread at the inside of the ends of the springs, as best shown in Figs. 1 and 2, so as to prevent circumferential movement of the tread with respect to the rim.

From the foregoing description, the construction, manner of assembling and principle of operation of my improved spring tire will be readily understood and no further explanation is necessary. It will of course be appreciated, however, that I reserve the right to make any changes, within the scope of the appended claims, without in the slightest degree departing from the spirit of my invention.

Having thus described the invention, what is claimed as new is:

1. In a spring tire, a rim including a ring adapted to encircle the felly of a wheel and having its inner face at one edge cut-away to provide an annular seat, the ring at its opposite edge being provided with an inwardly directed annular clamping flange and an outwardly directed annular guide flange terminating in a laterally and inwardly directed annular retaining flange, a locking section having an inwardly directed annular felly clamping flange, a centering flange engaging in the seat of the first ring, an outwardly directed guide flange, and an inwardly directed lateral retaining flange disposed in spaced relation to the retaining flange of the first ring, an annular tread substantially U-shaped in section having its sides movable through the space between the retaining flanges of the rings, laterally directed flanges formed at the free edges of the sides of the tread to engage the guide flanges and play between the felly encircling ring and the retaining flanges of the rings to limit the outward movement of the tread, cushioning means between the ring and the tread, and securing devices inserted through the guide flanges at the outer side of the felly encircling ring.

2. In a spring tire, a tread substantially U-shape in cross section formed at its inner edges with outwardly directed annular flanges, a two-part rim applicable to a wheel with the parts formed at their outer edges with inwardly directed annular flanges extending to the sides of the tread outwardly beyond the flanges thereon to retain the tread and at their inner edges with radially directed felly engaging flanges, cushioning means between the rim and the tread and fastening means passable through the parts of the rim between the tread and the felly-engaging flanges whereby to clamp the parts together to hold the tread in place and to also clamp the rim to the felly.

In testimony whereof I affix my signature.

HENRY P. TROUTMAN. [L. S.]

Copies of this patent may be obtained for five cents each, by addressing the "Commissioner of Patents, Washington, D. C."